April 21, 1970  B. B. PUSEY  3,507,977
CONNECTORS FILLED WITH POLYETHYLENE GREASE
Filed Dec. 4, 1968  4 Sheets-Sheet 1
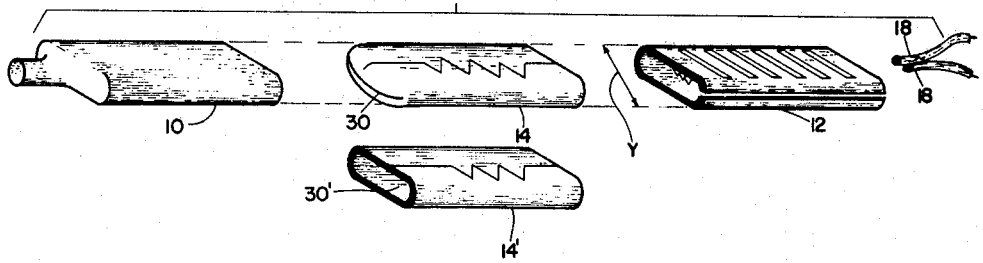
FIG. 1
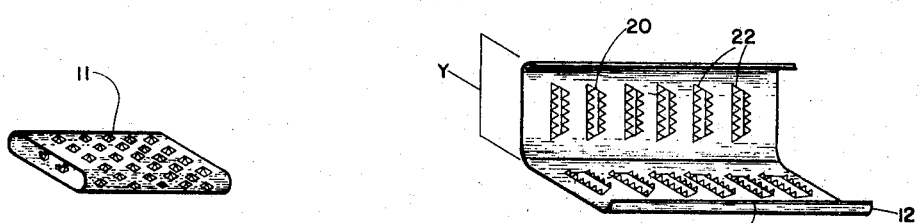
FIG. 3
FIG. 2
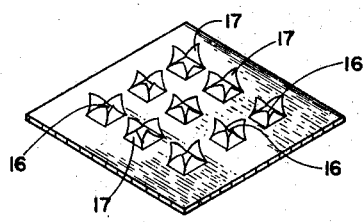
FIG. 4
INVENTOR
BRANDON BERNARD PUSEY
ATTORNEY April 21, 1970   B. B. PUSEY   3,507,977
CONNECTORS FILLED WITH POLYETHYLENE GREASE
Filed Dec. 4, 1968   4 Sheets-Sheet 2

INVENTOR
BRANDON BERNARD PUSEY
ATTORNEY

INVENTOR
BRANDON BERNARD PUSEY
ATTORNEY

United States Patent Office 3,507,977
Patented Apr. 21, 1970

3,507,977
CONNECTORS FILLED WITH POLYETHYLENE GREASE
Brandon Bernard Pusey, Hickory, N.C., assignor to Superior Continental Corporation, Hickory, N.C., a corporation of Delaware
Filed Dec. 4, 1968, Ser. No. 781,184
Int. Cl. H02g 15/08; H01r 5/12
U.S. Cl. 174—87   22 Claims

ABSTRACT OF THE DISCLOSURE

Disclosed herein is an assemblage of components making up a connector used for high-speed splicing of pairs of insulated electrical conductors in a telephone cable. First and second metal tube-like containers, the second slidably fitting into the first to form a composite, is fitted into a heat-shrinkable plastic sleeve having an elastic memory. A filling compound disposed inside of the metal tubes and plastic sleeve, made of low molecular weight polyethylene material having a grease-like viscosity, completes the connector assembly makeup. The purpose of the grease-like polyethylene filling is to render a splice between two electrical conductors, made with such an assembly, essentially unreachable by water, either in the liquid or vapor form.

DETAILED DISCLOSURE

This invention relates to the joining of electrical conductors and more particularly to the making of solderless insulated joints in insulated conductors without removing the insulating jacket therefrom.

An object of the present invention is a provision of a joint or splice where ends of insulated electrical conductors are joined together and insulated in a single simple operation by the use of a novel type of composite connector, which obviates the need for skinning or removing the insulation from the ends of the conductors to be joined.

Another object of the invention is the provision of a joint for insulated electrical conductors wherein a plurality of said conductors are joined or spliced together in a composite sleeve, which comprises an unitary structure having high insulating qualities combined with low electrical resistance.

A further object of the instant invention is the provision of a solderless connection between two or more insulated electrical conductors wherein a composite sleeve is deformed to cause one of the components thereof to rupture the insulation on the conductors at a number of points and establish a multiplicity of contacts with the electrical metallic members of the conductor.

A feature of the present invention is the provision of a connector or splice for insulated conductors wherein the medium, which establishes the electrical connection with the conductors, does so with varying degrees of penetration in order to minimize the possibilty of conductor breakage and to restrict any weakening of the conductor to that portion of the conductor within the confines of the sleeve.

A further feature of the invention is the provision of a novel type of insulation rupturing and contact making medium, utilized as a component part of the composite sleeve connected in this invention, wherein a plurality of spaced apart perforations define upstanding, tang-like protuberances on a separate liner to rupture the insulation on the conductor and bite into the metal portion thereof with a sliding, digging action.

A still further object of the instant invention contemplates a novel water-proof enclosure wherein a polyethylene grease-like material is disposed on the inside of a connector and completely surrounds that portion of the insulated electrical conductor longitudinally circumscribed by the connector itself.

The contemplated connector sleeve structure of this invention comprises a plastic envelope or outer covering, open at both ends and having enclosed therein a first liner of comparatively thin, hard metal and a second or outer liner of comparatively thick, soft metal. The liners and plastic envelope can be substantially oval in cross section, but not necessarily so, i.e., they can be circular as well. The inner liner is thin compared to second liner or sleeve, which is comparatively hard, and is provided with tangs or protuberances resulting from the type of perforations used. In using the connector of this invention, the wires to be joined are positioned within the confines of the inner sleeve of the structure heretofore described and are subsequently subjected to external pressure by a suitable tool to force the protuberances or tangs on the inner liner through the insulation on the conductors and into intimate contact with the metal portion of the conductors.

The configuration of the protuberances in one of the embodiments of the instant invention is such that the ends thereof, upon engagement with the metallic wire, will dig in slightly, curl and slide along the conductor. Inasmuch as the inner sleeve is constructed of hard spring-like material and the encompassing or embracing outer sleeve is comparatively soft and thick, the spring-back of the inner liner and the encompassing sleeve, which is kept within certain prescribed limits, is minimized and will cause the protuberances to dig into the metallic conductor, slide thereon and thereby make and maintain an electrical contact.

The inner sleeve is constructed of hard spring-like material and the encompassing or embracing outer shell is comparatively soft and thick. In general, when a metallic sleeve is compressed, there is spring-back of the sleeve wall when the compressing force is removed. By the use of the inner liner of spring material, this spring-back is compensated for by spring-back in the tangs of the liner, due to the energy stored in the tangs during the operation of pressing. Thus, the digging in and sliding of the tangs over the conductor metal, which occurs during pressing, is maintained and the good electrical contact therefor remains after the compressive force is removed.

By filling the assembled connector with a polyethylene grease-like material, either modified with fillers and/or antioxidants, or unmodified, a connector is realized whereby at least two insulated electrical conductors can be connected and the entire connection can be submerged in water, either liquid or vapor, with complete assurance that none of this water will find its way into the connector and subsequently be exposed to the electrical conductors. It has been found that because of this particular type of filling material (polyethylene grease-like material), a solderless joint completely submerged in water can withstand cycling temperatures between 25 and 60° C. with no measurable affect on any electrical properties for prolonged periods of time.

The invention will be more clearly understood from the following detailed description when read in connection with the accompanying drawings, in which:

FIGURE 1 is a perspective view of the connector of this invention disclosing the component parts thereof, together with a pair of insulating wires intended to be inserted therein;

FIGURE 2 is a perspective view of the inner sleeve before it is finally formed, disclosing the configuration of the protuberances on the interior thereof formed by the perforations therein;

FIGURE 3 is another embodiment of the inner sleeve as shown in FIGURE 2, disclosing the configuration of the protuberances on the interior thereof formed by the perforations therein;

FIGURE 4 is an enlarged perspective fragmentary view of that particular sleeve embodiment shown in FIGURE 3, showing a portion of the inner sleeve that discloses the configuration of the protuberances on the interior thereof formed by the perforations therein;

Figure 5:
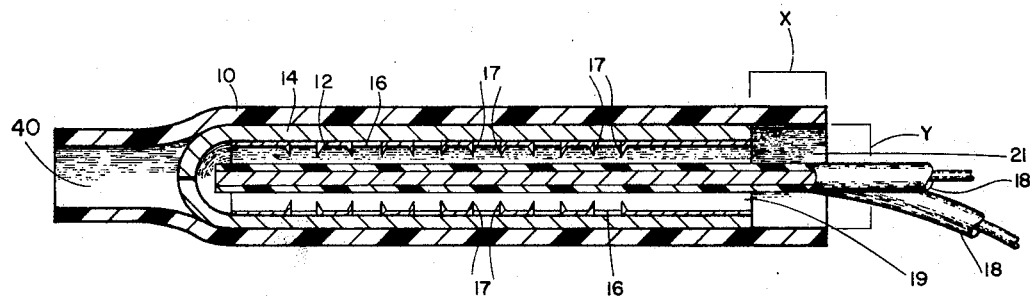
FIGURE 5 is an enlarged longitudinal sectional view, illustrating the relative position of the assembled connector and the components of the connector, not filled with polyethylene grease-like material, before deformation of the connector.

In the drawings, the connector of this invention (see FIGURE 1) comprises three components; namely, an outer tube-like plastic jacket 10 open at both ends, a first inner metallic sleeve or inner liner 12, which can be either of the embodiments shown in FIGURES 2 or 3, and a second outer metallic sleeve or outer liner 14. The plastic jacket 10 comprises a heat-shrinkable material, which has an elastic memory such as polyethylene, and is heat shrunk onto the outer sleeve 14 when the components are assembled during manufacture. A pair of insulated electrical conductors or leads 18 are placed into the interior (cavity 19 of FIGURE 5) of sleeve 12 when the conductor is to be used. As shown in FIGURE 1, the interior liner or inner sleeve 12 is comparatively thin with respect to the outer liner 14 and is constructed of hard spring-like material such as tin-coated spring-tempered Phosphor bronze, aluminum alloys, and aluminum clad with aluminum alloys. The inner surface of the sleeve 12 is provided with a plurality of inturned elongated perforations 20 either extending transverse to the actual direction of the sleeve as shown in FIGURE 2 or systematically disposed in the sleeve as shown in the embodiments of FIGURES 3 and 4. Turning attention briefly to that embodiment of FIGURE 2, protuberances shown here form a number of substantially flat and aligned saw-toothed tangs 22 that project transverse to the plane of the perforations. The protuberances 22 form a series of contiguous knife-like edges, of saw-tooth shape.

Turning momentarily to the sleeve embodiments shown in FIGURES 3 and 4, the configuration of the perforations 16 and the resulting protuberances or tangs 17 is such that a plurality of curved upstanding knife-like edges are provided for each perforation. The outer metallic sleeve 14, FIGURE 1, can be formed of a soft, permanently deformable material, such as annealed brass.

Each perforation 20 or 16 and its protuberances 22 or 17 are formed in the sleeve 12 when it is still in a flat condition by a suitable tool. Such a tool forms no part of this invention and details for such a tool can be found in U.S. Patent 3,265,807 (174-87), the disclosure of which is incorporated herein by reference.

The tangs can be of a substantially flat saw-tooth shape in alignment with each other and can have substantially straight bases which impart very little curvature about their vertical axis in regards to the embodiment shown in FIGURE 2. On the other hand, protuberances can be made along the design shown in FIGURES 3 and 4 and disclosed by U.S. Patent 3,064,072 (174-87), the entire disclosure of which is incorporated herein by reference. Either one of the tang protuberances shown in embodiments of FIGURE 2 on the one hand and FIGURES 3 and 4 on the other can be used in the instant invention with equal success.

Before or after, preferably after, the tangs have been produced in the sleeve 12, its edges 38 are cut along its longitudinal axis and curved as shown in FIGURE 2 and then bent or shaped as shown in FIGURE 1, elements 12 and 38. The connector is then assembled by placing the inner liner 12 into the soft outer liner 14 and then heat shrinking the insulating plastic jacket 10 about the outer liner. Subsequently, polyethylene grease-like material is pumped or poured into that space 19 defined by plastic jacket 10, not otherwise occupied by outer metallic sleeve 14 and inner liner 12. It is to be noted that this grease-like material fills not only the cavity 19 defined by outer liner 14, not otherwise occupied by inner liner 12, but also that space or volume defined by outer plastic jacket 10 extending beyond the terminal portions of outermost metallic sleeve 14. The extension of this plastic sleeve and the fact that both extensions are not closed, but are in fact open and substantially filled with polyethylene grease-like material, forms an essential feature of the instant invention.

Viewing FIGURE 5 there will be noted a linear dimension indicated by the letter X. This dimension acts as a definite functional relationship with that dimension shown in the same figure by the letter Y. This latter dimension is also indicated in FIGURE 1 as well as FIGURE 2. A dimensional relationship between the longest dimension, assuming a non-circular cross-section, of the outer deformable sleeve member 14 and that amount of plastic sleeve 10 overhang extending beyond the open mouth terminal portion of the deformable outer sleeve member 14 in combination with the filling of the connector with the polyethylene grease-like material has been found to be optimum where linear dimension X is no less than the greatest linear dimension Y. That is to say, the amount of plastic overhang X must be at least equal to the longest dimension of outer deformable sleeve member 14 assuming a non-circular cross-section of such outer sleeve member; however, if a circular outer sleeve member 14 is used, then the outside diameter of this member 14 is to be used as the dimension Y. This latter Y dimension always contemplates an outside measurement rather than an inside measurement so as to take into account the amount of metal (wall thickness of outer sleeve 14) exposed at its terminal portion.

Polyethylene grease-like material, shown by element 19, is disposed in this cavity so as to be essentially flush with the terminal portion of the larger open end of plastic sleeve 10. It also occupies most of that volume indicated by element 21. After the components 10, 14, and 12 have been assembled and plastic tube 10 has been heat-shrunk into its position as shown in FIG. 5, polyethylene grease-like material is either poured or pumped into an open end of the plastic sleeve and caused to flow down into and essentially fill cavities 21, 40, and 19. Furthermore, this grease also flows through seam or opening 30 (element 14 of FIGURE 1) and into cavity 40 formed by plastic sleeve 10 in the left-hand portion of FIGURE 5. Here again the polyethylene grease essentially fills cavity 40 and is essentially flush with the left-hand terminal portions of plastic tube 10. Outer sleeve member 14 can be essentially tubular in the sense that it can have two open ends as shown by alternate embodiment 14' in FIGURE 1, i.e. opening 30' can be used as a replacement for seam 30.

Figure 6:
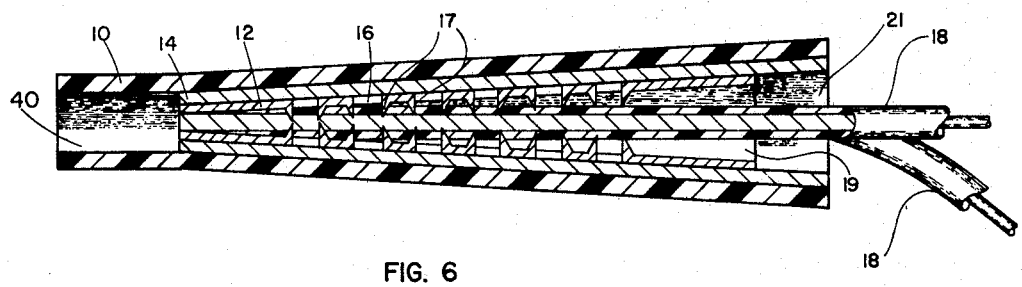
FIGURE 6 is a view similar to FIGURE 5, illustrating the appearance of the connector, and insulated electrical conductors contained therein after the connector assembly has been deformed; illustrating how the insulation is ruptured and the protuberances bite into the metal conductor.

A connector made in the manner such as that described above when ready to be put in service, is slipped over a pair of insulated electrical conductors 18 as shown in FIGURE 5. Any of the polyethylene grease 19 that is caused to be displaced by the insertion of insulated electrical conductors 18 flows out of either one of the terminal openings of tube-like plastic member 10. Subsequently, a compression tool is employed to apply compression to the plastic tube 10, which in turn collapses the deformable outer sleeve member 14 and causes the sharp tank-like inwardly oriented protuberances 22 or 17 to pierce the insulation of electrical conductors 18 and come into contact with the metal portion of the insulated electrical conductors 18 as shown in FIGURE 6. Because inner sleeve 12 is constructed of hard spring-like material and the encompassing or embracing outer shell 14 is comparatively soft and thick, there is upon compression a spring-back of the sleeve walls when the compressive force is removed. By the use of the inner layer of spring material, element 12, this spring-back is compensated for by the tangs of the liner, due to the energy stored in the tangs during the operation of the pressing. Thus, the digging in and sliding of the tanks over the conductor metal, which occurs during the pressing, is maintained and a good electrical contact remains after the compressive force is removed. Such phenomenological observance is especially attributable to that embodiment shown in FIGURES 3 and 4.

Ideally, the perforations disclosed in FIGURES 3 and 4 should be square; that is, they should be produced by pyramidal punches that are guided by square hole guides to pass through the metal and enter square openings in a die that supports the metal; however, since dies and guides having a number of square holes are prohibitively costly, it has become necessary in practice to use pyramid-tipped round punches with dies and guides having round holes. With such equipment, the perforations take on a circular shape; and, the triangle protuberances, rather than being plain, are cylindrical about an axis perpendicular to the sleeve surface. This curvature adds a degree of stiffness to the protuberances and this stiffness limits the distance they can be elastically deflected without reaching the yield point. Thus, after plastic deformation, such as by pressing the connector to connect conductors, the cylindrical curvature limits the distance through which the protuberances will spring back. As the connector ages during its expected 40 to 60 year life span, the comparatively stiff protuberances of limited spring-back may not accommodate themselves elastically to changes in the shape of the conductors and sleeves and therefore may not maintain the desired stability of electrical contact.

The tangs or protuberances as shown by the embodiment of FIGURE 2 present an alternative as shown in FIGURES 3 and 4 and multiply the probability, in connectors of the type described, of a large number of protuberances piercing the insulation and establishing electrical contact with the metallic core of the conductor. These protuberances or tangs are formed by piercing or cutting the metal along a plaurality of zig-zag paths each traverse to the axis of the sleeve and pushing in the saw-tooth protuberances formed thereby so as to produce the elongated perforations. Such saw-tooth protuberances are flat and have bases extending along a straight line defining the perforation edge. Preferably the webs between perforations are made sufficiently long relative to the metal thickness to deflect elastically like a beam in response to forces on the tangs. This featue extends the distance through which the tangs can springback after deformation.

It has been disclosed in U.S. Patent 3,151,213 (174–84) to pack a connector in a grease before a splicing is attempted. This particular disclosure goes on to indicate that there is a self-healing action after a splicing has taken place and that water is excluded from a splice by use of such grease in the connector per se. Silicone "bearing grease" of medium viscosity (about the consistency of Vaseline) petroleum jelly at 70° F. is indicated by this particular identified disclosure as being apparently ideal. In contradistinction to the above identified disclosure, the instant invention uses a polyethylene grease-like material. During the development of the instant invention, the well-known silicone greases as disclosed by the prior art, were evaluated in comparison to the polyethylene grease-like material. This investigation revealed the surprising fact that silicone greases were not at all desired. One of the many reasons mitigating against silicone grease was the fact that silicone grease tends to be toxic to some sensitive human beings. Thus, its use is an obvious liability during any manufacturing process where these particular human beings are involved. Furthermore, the silicone grease has a cost factor that is most prohibitive. At the present, silicone grease has a cost between $4 and $5 per pound, whereas the polyethylene grease-like material costs in the neighborhood of $.20 to $.30 per pound. The advantages of using polyethylene grease is quite obvious from this economic standpoint alone. Additionally, the silicone grease has a melting point in excess of 300° F. whereas on the other hand, polyethylene grease-like material has a melting point in the neighborhood of 135° F. The difference in melting points is quite significant from two standpoints. First, the spaces inside of the connectors not otherwise occupied by the outer and inner sleeve members are essentially rather small. In such small interstitial spaces there exists, when the grease flows thereto, very high frictional forces that are not conducive to easy flow. The high viscosity of silicone, in comparison to the polyethylene grease-like material, increases this resistance. Thus, the silicone grease does not readily flow into these interstitial spaces under ordinary gravity or pressure flow. If one were to use air pressure to force the silicone grease into these small interstitial spaces, as may be used in the instant invention to force polyethylene grease-like material into the desired space, voids are created because of the air being blown by isolated masses of silicone grease. These isolated masses are created by the inherent viscosity of the silicone grease per se. Such a filling procedure creates void spaces and is obviously undesirable. On the other hand, when one uses the polyethylene grease-like material as disclosed by the instant invention, one only needs a low pressure air feed or a gravity feed, the latter mode of deposition being especially applicable when the polyethylene grease is heated to 135° F. (its "melting" point). Consequently, when gravity feed is used in combination with heated polyethylene grease-like material void creation is avoided, whereas when using silicone heated to 350° F., this material has a propensity to inherently create air pockets notwithstanding its heated condition.

A second advantage in using polyethylene grease-like material is that most sheath materials of telecommunication connectors (plastic sheath 10) for example are themselves made of polyethylene, either the high or the low density type. Because both the grease-like material 19 and the non-grease like, but solid polyethylene material 10 are made from like molecules, the two materials are chemically compatible and one is therefore not deleterious to the other. Silicone grease in service and in the same space now occupied by the instant invention by polyethylene grease has shown a tendency to induce cracking, corrosion and deterioration to the polyethylene sheath materials, as well as the strange phenomenological observation that both metal and plastic sleeves have been observed to be physically "repelled" by silicone grease. Connectors using an outer plastic sleeve and silicone grease, upon being subjected to temperature cycles in actual field trials, have been observed to lose their plastic jacket as well as outer metal liner due to a "repelling" action by the silicone grease. This behavior has not been observed when polyethylene grease was used. It is surmised that this unfortunate occurrence may be related to the dissimilarity in molecular construction. Furthermore, when polyethylene grease-like material is used and a polyethylene jacket is used in combination, these particular materials have similar expansion and contraction coefficient upon changes in temperature. Consequently, upon the expansion and contraction of the polyethylene sheath-like material 10 the polyethylene grease-like material 19 correspondingly follows the same expansion and contraction. This may explain why the silicone grease expells the outer metal 14 and plastic jacket 10 whereas the polyethylene grease does not.

Polyethylene grease-like material, as envisioned by the instant invention, can be described as an amorphous polyethylene having an average molecular weight below about 10,000 and a density of below about 0.91, namely 0.851 gram per milliliter at 25° C. This grease is marketed by Dow Chemical Company of Midland, Mich., under the designation of QX–4213.3, and has been tested by the same equipment used to test well-known polyethylenes as defined by ASTM D–1238.65T. Essentially the same method as employed by this ASTM designation was used to test this particular polyethylene grease-like material, except for slight modifications. One such modification was that the extrusion barrel was heated to 100° C. instead of 125° C., as called for in the aforementioned ASTM specification. This temperature modification was necessary because of the viscosity of the polyethylene grease material, i.e. it is characteristic of this grease to become highly fluid when exposed to any high degree of heat. The melt index (flow rate) measured using this modified ASTM method was 10 to 20. A 22,160 gram load (piston and weight) was used in this modified ASTM test, as well as an orifice of 0.020 inch. Other data supplied by the Dow Chemical Company on other properties of the polyethylene grease are as follows:

TABLE I.—PROPERTIES OF POLYETHYLENE GREASE

| Property | Condition | Value |
| --- | --- | --- |
| Power factor | 1–100 kc | Less than $5 \times 10^{-5}$. |
| Pour point | | Approx. −10° C. |
| Coefficient of Volumetric Expansion. | 25° C | $7.3 \times 10^{-4}$. |
| Density | 25° C | 0.581 gram per milliliter. |
| Water absorption (percent). | 24 hours at 100% R.H. | 0.01%. |
| Mean specific heat | −40 to 100° C | Less than 0.53 cal/°C./gm. |

The polyethylene grease as described above can be either used as such or in a modified form. It has been found advantageous to modify the polyethylene grease with two to fifteen parts by weight, in a total of 100 weight parts, of a hydrophobic amorphous silica having a surface area falling within the inclusive range of 95 to 150 square meters per gram. The viscosity of the polyethylene grease is improved by this modification; however, whenever a particulate matter having such a large surface area per mass is added to an already viscous material, it is important to recognize that any air bubbles included during mixing the particulate matter with the grease must be removed. Otherwise, these air bubbles form a path along which water can travel. Consequently, it has been found advantageous to heat the polyethylene grease so as to reduce its viscosity and surface tension while the amorphous silica particulate matter is being mixed therewith.

Liquid water or water vapor and varying temperatures are the major causes of failure of cable connectors. Whenever liquid water or water vapor is available during the service life of the cable splice, it slowly migrates into the connector's outer cover until it contacts a metallic part of the connector and shorts it to ground or to other wetted connectors within the splice. Variations in temperature accelerate deterioration of the connector's serviceability by (a) forcing dry air (a good insulator) out of the conductor when the temperature increases and then (b) drawing water vapor or water into the connector to replace the dry air when the temperature moderates. Therefore, a good test for the moisture and water proofness of a connector is a continuous emergence of the connector in a body of water while the water temperature is cycled. Connectors of this invention as well as prior art connectors were held under water while the water temperature was cycled between ambient water temperature of about 25° C. and 60° C. Insulation resistance under a test potential of 500 volts DC was measured between the insulated conductors and the water in the test chamber. The temperature of the water, as previously mentioned, was cycled between essentially 25° C. and 60° C. with essentially one hour holds at the upper most and lower most temperatures. Assuming a two-hour cycle period, then approximately twelve cycles per day were accomplished, disregarding time needed for heat up and cool down of the water between cycling extremes.

Figure 7:
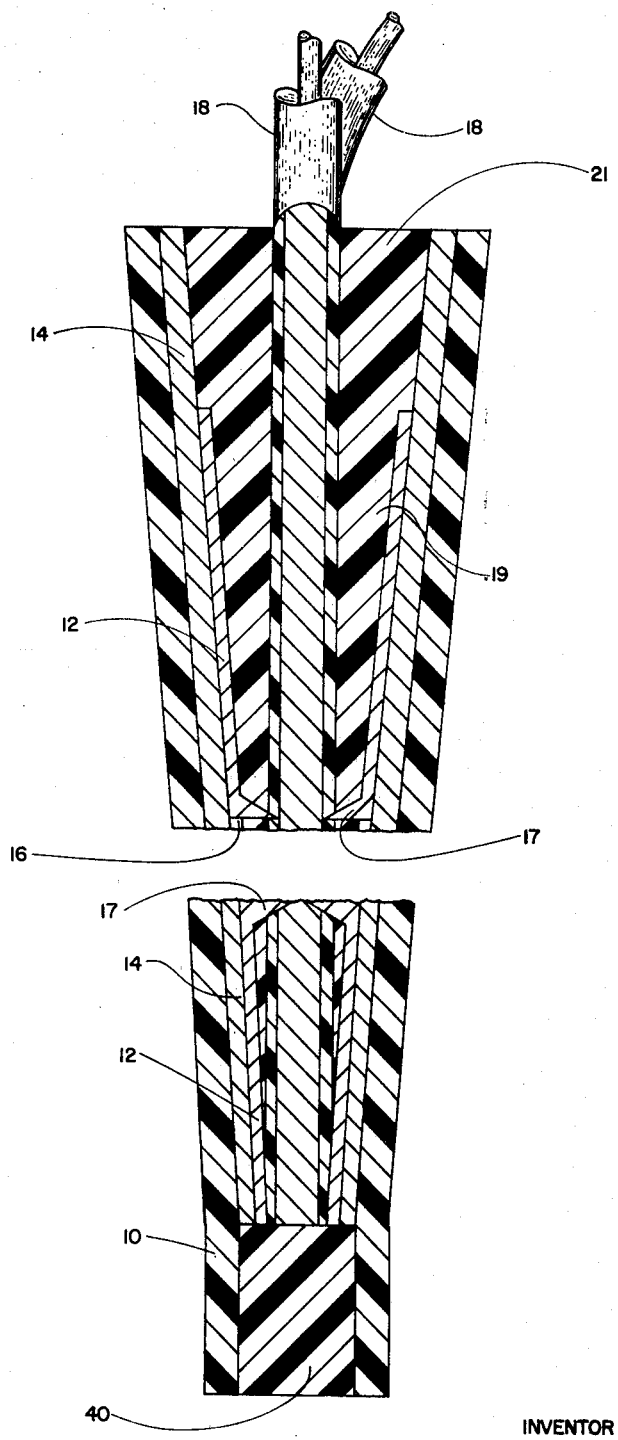
FIGURE 7 is a view of the connector shown in FIGURE 6 filled with polyethylene grease.
Figure 8:
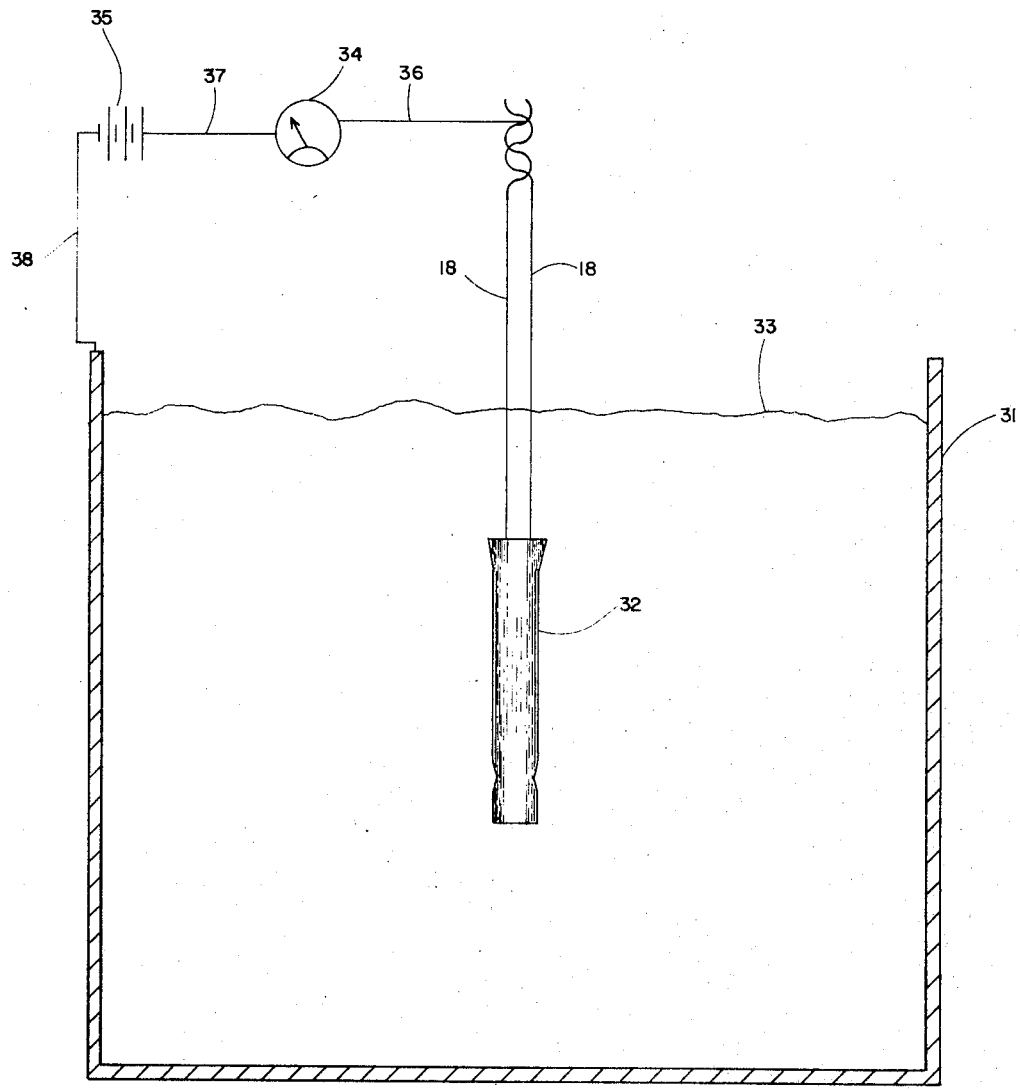
FIGURE 8 is a cross-sectional view of the test apparatus used to test the resistance to water penetration possessed by connectors of the instant invention as well as prior art connectors.

A cylindrical copper tank 31, shown in FIGURE 7, was made for this work, which held about five quarts of continuously stirred water. To heat up the water, a 500 watt immersion heater was used and a connection was made to the water supply solenoid valve to flood in water to cool the bath contained by copper tank 31. A timer (not shown) was used to turn on the heater (also not shown) at T=0. At T=one hour, the heat was turned off and the tap water was run in until T=two hours and then the cycle was repeated.

Test apparatus as shown in FIGURE 7, as partially described above, primarily consisted of a copper tank 31 filled with water 33. Lead 38 was attached to the copper tank and led into one side of battery 35. Lead 37 was attached to the other terminal of battery 35 and into ohm-meter 34. Lead 36 was connected to the other terminal of ohm-meter 34 and electrically connected to electrical conductors 18 at a place where insulation of these electrical conductors had been stripped away. That twisted portion of insulated electrical conductors 18, as shown in FIGURE 7, is that portion of otherwise insulated electrical conductors which have had their insulation stripped for purposes of making the contact. The two insulated electrical conductors 18 were spliced together by means of connector assembly 32, immersed in water 33 and cycled through varying degrees of temperature as previously explained. Obviously, the reading of ohm-meter 34 would give the resistance between copper tank 31 and insulated electrical conductors 18. From an understanding of the above discussion, it would be immediately clear that upon the water 33 reaching any of the metallic portion of the insulated electrical conductors 18, ohm-meter 34 would show a decrease in resistance. Furthermore, as a general rule, the more the water accumulation around the metallic portion of insulated electrical conductors 18 the lower the resistance reading of ohm-meter 34.

Using the apparatus set up as set forth in FIGURE 7, prior art filled connectors were tested to determine their resistivity to water permeability. A well-known silicone filled conductor was used as element 32 and failed after only 50 cycles. A connector somewhat similar in physical structure to the connector disclosed by the instant invention, but filled with a reaction product of a fatty acid and a glycol also failed after 50 cycles. The material used to fill the last mentioned connector appeared to be hydroscopic in nature and not hydrophobic as the polyethylene grease-like material as used by the instant invention. In contradistinction to the prior art electrical connectors discussed above, a connector filled with the polyethylene grease as disclosed by the instant invention, either per se or modified, exhibited a resistance of $8 \times 10^{12}$ ohms after 318 cycles. Failures have never been observed. The same result was achieved when an antioxidant was added to the polyethylene grease for the same number of cycles. Such data would indicate that the presence of an antioxidant was unnecessary although perhaps desirable from a long range in-service standpoint.

One important aspect of the instant invention is the length that plastic sheet 10 extends beyond the open-mouth terminal portion of outer metallic sleeve 14. Such an extension is shown by the dimension X in FIGURE 5. Prior art connectors of the same type as that of the instant invention did not have a filling compound inside the cavity 19 created by elements 14 and 12, not otherwise occupied by insulated electrical conductors 18.

Polyethylene grease-like material either per se or when mixed with a finely divided particulate material, such as amorphous silica having a high surface area per unit weight ratio, presents a problem of air bubbles. Such air bubbles are unfortunate in the sense that they create a path along which either liquid water or water vapor can and does travel. Thus, when using a polyethylene grease-like material, or a substance of like viscosity, it is imperative whether or not such a material contains a particulate admixture, to see to it that air bubbles are essentially eliminated. It has been found by experimentation that if the polyethylene grease-like material of the instant invention, either per se or mixed with the amorphous finely-divided silica, is heated in the neighborhood of 500° F., no air bubbles of a deleterious nature are left in the mixture. With the above discussion in mind, if polyethylene grease-like materials are deposited in cavity 19 (FIGURE 5), having no thermal history or any other act that would tend to expel inherent bubbles in the grease material itself, plastic outer member 10 must be extended beyond the terminal open mouth portion of outer metallic member 14 by the distance X as shown. This dimension X is a function of and is preferred to be no less than the greatest outside dimension Y of outer metallic sleeve member 14. In short, it makes a difference whether or not the polyethylene grease-like material deposited in cavity 19 has had a history of bubble removal or not. If the bubbles have been removed from the polyethylene grease-like material, then the outer plastic sheath 10 can extend beyond the open-mouth terminal portion of outer metallic sleeve member 14 a distance less than that shown by the dimension X in FIGURE 5. On the other hand, if no attempt is made to remove the bubbles from the polyethylene grease-like material, then the amount of overhang of plastic sheath 10 must be no less than that shown by dimension X, which in turn is no less than that largest outside dimension Y of metallic sleeve 14.

It will be observed that plastic sheath member 10 is open at both ends. This dual open-end structure is desired in order to cut down on the amount of air entrapped inside a filled connector during the filling of the connector. During the process of manufacturing, an assembly is created like that shown in FIGURE 5, except for the presence of insulated electrical conductors 18. Into the cavity 19 there is pumped, or poured under gravity feed, polyethylene grease-like material. If the material is first heated to remove residual bubbles therein, then the polyethylene grease can be poured into cavity 19. Otherwise, some arrangements for pumping the grease into cavity 19 must be made. Since outer metallic sleeve member 14 has a slit 30 (FIGURE 1) or is opened at both ends, as shown in an alternate embodiment in FIGURE 1, then the polyethylene grease-like material as it enters one opening of the connector essentially purges all of the air from the interior of cavity 19 during this filling process. If plastic sleeve member 10 were closed at one end, a filling process, either by pouring or pumping, would obviously entrap air into such a connector. In view of the fact that entrapped air is most undesirable, it is readily seen why it is advantageous to provide a plastic outer sleeve 10 and outer metallic sleeve member 14, both adapted to permit flow of polyethylene grease throughout their respective lengths.

In summary, the above disclosure has described an assemblage of components making up a connector used for high speed splicing of pairs of insulated conductors in a telephone cable. First and second metal tube-like containers, the second slidably fitting into the first to form a composite, are fitted into a heat shrinkable plastic sleeve having an elastic memory. A water-proof connector can be made by providing a filling compound disposed on the inside of the metal tubes and plastic sleeve, this filling compound being made up of low molecular weight polyethylene material, having a grease-like viscosity, the molecular weight being below about 10,000 and the material having a density of 25° C. of about 0.85 gram per millimeter. Water, either in the liquid or vapor form is essentially excluded from any contact with insulated electrical conductors connected together in electrical fashion by the novel connector of the instant disclosure. Polyethylene grease-like material, as used by the instant invention, has unique properties, other than cost, over and above that of the well-known silicone greases. Experimentation has shown that when a plastic container is filled with a silicone grease and an electrical connection is made between two insulated electrical conductors inside of the plastic container, temperature cycling of the thus formed composite results in the phenomenological observation of the silicone grease "repelling" the container in which it was originally placed. When polyethylene grease-like material was substituted for the silicone grease, temperature cycling of the thus formed composite did not cause the plastic container to slip off of or be repelled by the polyethylene grease. No ready explanation for such a phenomenon has been established, even though it can be speculated that the similarity in molecular structure between the polyethylene grease and the plastic (high density polyethylene) container in which it was placed was such that the coefficient of thermoexpansion and contraction of the two similar materials rendered the container and its contents engageably compatible. Whereas, on the other hand, high density polyethylene containers filled with silicone grease were not necessarily so compatible, but possessed different coefficients of thermoexpansion and contraction and accordingly were observed to separate one from another upon being subjected to cycling temperatures.

I claim:

1. A connector for joining the ends of insulated electrical conductors comprising in combination an outer sleeve of insulating material having on its interior a pair of metallic sleeves coaxially disposed in telescopic relation, the intermost sleeve of which having spaced-apart perforations defining inwardly extending insulation piercing and wire engaging protuberances whereby pressure applied to said outer insulating sleeve will exert a crushing action to an outer liner which in turn will crush said intermost liner and aforesaid protuberances thereon through the insulation on the conductor and establish electrical contact with the metallic conductor thereon, and that cavity defined by said outer sleeve of insulating material, not otherwise occupied by said pair of metallic sleeves containing a grease-like material, said grease-like material consisting essentially of polyethylene grease having a flow point below 160° F.

2. A connector defined in claim 1 wherein said insulating material is a tubular-like sleeve both ends of which are hermetically opened.

3. A connector as defined in claim 1 wherein said outer sleeve of insulating material has an elastic memory.

4. A connector as defined in claim 3 wherein said intermost metallic sleeve is composed of relatively hard spring-like material and said outermost metallic sleeve is composed of relatively soft material.

5. A connector as defined in claim 1 wherein said outer sleeve of insulating material extends beyond a terminal portion of the longest of said metallic sleeve by a distance no less than the largest transverse dimension of said metallic sleeve.

6. A connector for joining the ends of insulated electrical conductors comprising in combination:
   (a) an outer sleeve of insulating material;
   (b) a metallic means for penetrating the insulation of electrical conductors and to establish electrical contact therewith disposed inside of said outer sleeve of insulating material; and
   (c) that cavity created by said outer sleeve of insulating material, not otherwise occupied by said metallic means, essentially filled with a material consisting essentially of a polyethylene grease having a molecular weight below about 10,000.

7. A connector as defined in claim 6 wherein said polyethylene grease has a thermal history in excess of 400° F. to remove residual gas therefrom.

8. A connector as defined in claim 6 wherein said outer insulating sleeve of insulating material extends beyond a terminal portion of said metallic means by a distance no less than the largest transverse dimension of said metallic means.

9. A connector as defined in claim 6 wherein said metallic means comprises a pair of metallic sleeves coaxially disposed in telescopic relation the intermost sleeve having spaced-apart perforations defining inwardly extending insulation piercing and wire engaging protuberances.

10. A connector as defined in claim 6 wherein said polyethylene grease contains finely divided filler material within the inclusive weight range of five to fifteen percent.

11. A connector as defined in claim 10 wherein said filler material is a finely divided silica.

12. A connector as defined in claim 11 wherein said finely divided silica has between 90 to 150 square meters of surface area per gram of mass.

13. A covering for protecting the joined ends of electrical conductors comprising an outer sleeve of insulating material containing a grease-like material, said grease-like material consisting essentially of polyethylene, having a flow point below about 160° F.

14. A covering as defined in claim 13 wherein said insulating material is tubular in shape, both ends of which are hermetically open.

15. A covering as defined in claim 13 wherein said polyethylene grease-like material contains finely-divided filler material within the inclusive weight range of 5 to 15 percent.

16. A covering as defined in claim 15, wherein said finely-divided filler material is silica.

17. A covering as defined in claim 15, wherein said finely-divided filler material has between 90 to 150 square meters of surface area per gram of mass.

18. A covering as defined in claim 13 wherein said polyethylene grease as a thermal history in excess of 400° F. to remove residual gases therefrom.

19. A covering as defined in claim 13 wherein said polyethylene grease material is in contact with and surrounds electrical conductors secured one ot another in electrical connection.

20. A covering for protecting the joined ends of electrical conductors comprising an outer insulating sleeve of polyethylene filled with a material consisting essentially of polyethylene grease having a flow point below 160° F.

21. A covering as defined in claim 20 wherein said polyethylene grease contains 5 to 15 weight percent of finely-divided silica filler material, having a surface area between 90 to 150 square meters per gram of silica mass.

22. A covering as defined in claim 21 wherein said polyethylene grease is in contact with and surrounds electrical conductors mechanically secured one to another to form an electrical connection.

References Cited

UNITED STATES PATENTS

| | | | |
|---|---|---|---|
| 2,886,626 | 5/1959 | Burnett et al. | |
| 2,906,810 | 9/1959 | D'Ascoli | 174—87 |
| 3,265,807 | 8/1966 | Smith | 174—87 |
| 3,283,061 | 11/1966 | Bolling | 174—87 |

DARRELL L. CLAY, Primary Examiner

U.S. Cl. X.R.

29—628; 174—84; 339—115